(12) United States Patent
Iwasaki

(10) Patent No.: US 11,353,779 B2
(45) Date of Patent: Jun. 7, 2022

(54) IMAGE PICKUP APPARATUS

(71) Applicant: CANON KABUSHIKI KAISHA, Tokyo (JP)

(72) Inventor: Takafumi Iwasaki, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 31 days.

(21) Appl. No.: 16/745,714

(22) Filed: Jan. 17, 2020

(65) Prior Publication Data
US 2020/0241395 A1 Jul. 30, 2020

(30) Foreign Application Priority Data
Jan. 30, 2019 (JP) .............................. JP2019-013795

(51) Int. Cl.
*G03B 17/14* (2021.01)
*G02B 7/14* (2021.01)

(52) U.S. Cl.
CPC .............. *G03B 17/14* (2013.01); *G02B 7/14* (2013.01)

(58) Field of Classification Search
CPC .............................. H04N 5/2254; G03B 17/14
See application file for complete search history.

(56) References Cited

U.S. PATENT DOCUMENTS

| | | | | |
|---|---|---|---|---|
| 5,848,314 A | * | 12/1998 | Ito ........................ | G03B 17/02 396/535 |
| 2006/0216023 A1 | * | 9/2006 | Tokiwa ................. | G03B 17/02 396/532 |

FOREIGN PATENT DOCUMENTS

| JP | 2013-246198 A | 12/2013 |
|---|---|---|
| JP | 2013246198 A | * 12/2013 |

* cited by examiner

*Primary Examiner* — Noam Reisner
(74) *Attorney, Agent, or Firm* — Cowan, Liebowitz & Latman, P.C.

(57) ABSTRACT

An image pickup apparatus includes a mount portion, a lock member movable between a lock position for locking the interchangeable lens unit and an unlock position for unlocking it, and forced from the unlock position toward the lock position, an operation member movable from a nonoperation position to an operation position in response to a press operation for moving the lock member from the unlock position to the lock position, and an interlock member movable by the pressed operation member and configured to move the lock member from the lock position to the unlocked position. The interlock member includes a contact portion configured to contact a contacted portion provided on either the lock member or a member configured to move integrally with the lock member, and at least one of the contact portion and the contacted portion has a convex shape toward the other.

9 Claims, 7 Drawing Sheets

IMAGE PICKUP APPARATUS

BACKGROUND OF THE INVENTION

Field of the Invention

The present invention relates to an image pickup apparatus which an interchangeable lens unit can be attached to and detached from.

Description of the Related Art

The image pickup apparatus described above includes a lock member (lock pin) for locking the interchangeable lens unit mounted on a mount portion, and an operation member (unlock button) for unlocking the lock pin. The lock pin moves between a lock position that protrudes from a mount plane of the mount portion in order to lock the interchangeable lens unit and a unlock position that retreats from the mount plane to unlock the interchangeable lens unit.

FIG. 8 illustrates a lens unlocking mechanism for moving a lock pin 302 from the lock position to the unlocked position in response to a press operation of an unlock button 301. One end of an interlock member 303 is integrally movably fixed onto the lock pin 302, and another end 304 of the interlock member 303 contacts a contact portion 305 of the unlock button 301. A lock spring 306 disposed around the lock pin 302 forces the lock pin 302 toward the lock position via the interlock member 303. A button spring 307 disposed below the unlock button 301 forces the unlock button 301 from an operation position toward a nonoperation position.

When the unlock button 301 is pressed (unlocked) by the user in an arrow 310 direction, the contact portion 305 presses the interlock member 303 and moves the lock pin 302 to the unlocked position together with the interlock member 303. A similar lens unlocking mechanism is also disclosed in Japanese Patent Laid-Open No. ("JP") 2013-246198.

As the image pickup apparatus becomes smaller, a lens unlocking mechanism is demanded which is smaller than the conventional lens unlocking mechanism disclosed in FIG. 8 and JP 2013-246198. In addition, the conventional lens unlocking mechanism may not provide a good operational feeling during the unlock operation, since the lock pin that is movably held by a hole portion provided in the mount portion is likely to tilt to the hole portion.

SUMMARY OF THE INVENTION

The present invention provides a compact image pickup apparatus having a lens unlocking mechanism that can provide a good operational feeling.

An image pickup apparatus according to one aspect of the present invention includes a mount portion on which an interchangeable lens unit is mounted, a lock member movable between a lock position for locking the interchangeable lens unit mounted on the mount portion and an unlock position for unlocking the interchangeable lens unit, and forced from the unlock position toward the lock position, an operation member movable from a nonoperation position to an operation position in response to a press operation for moving the lock member from the unlock position to the lock position, and an interlock member movable by the pressed operation member and configured to move the lock member from the lock position to the unlocked position. The interlock member includes a contact portion configured to contact a contacted portion provided on either the lock member or a member configured to move integrally with the lock member, and at least one of the contact portion and the contacted portion has a convex shape toward the other.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

Figure 1:
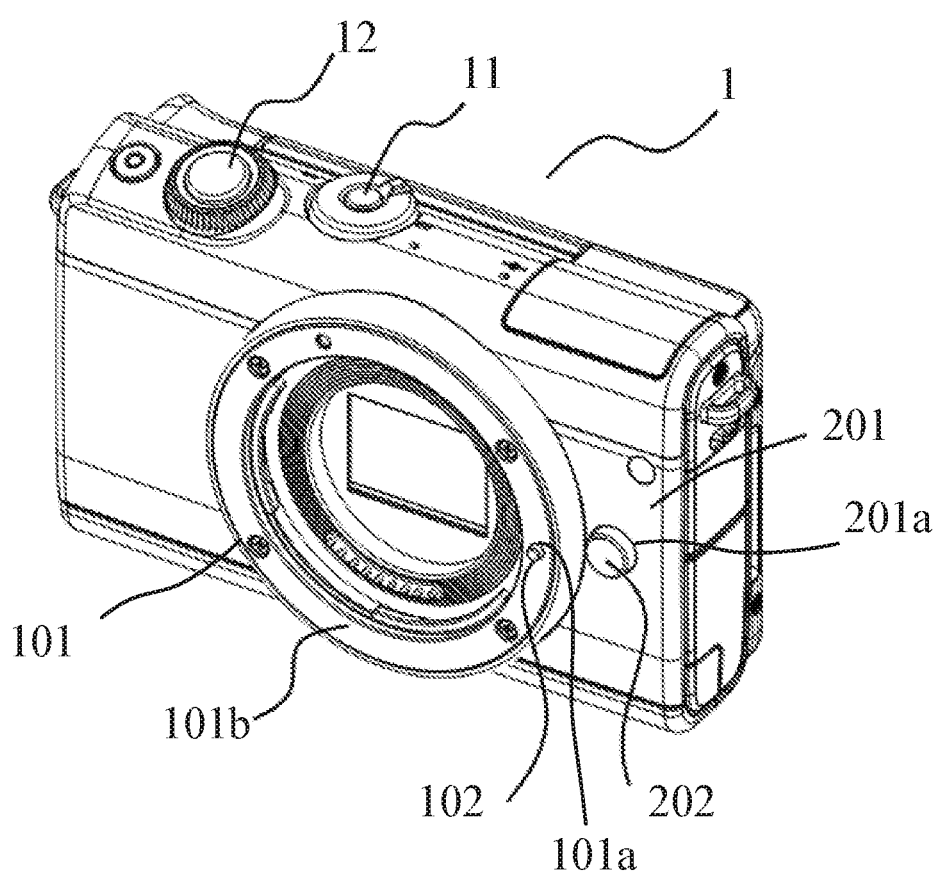
FIG. 1 is a perspective view of an image pickup apparatus according to one embodiment of the present invention.

FIG. 1 illustrates an overview of an image pickup apparatus 1 according to one embodiment of the present invention. The image pickup apparatus 1 has a power button 11 that is operated by a user to turn on and off the power and a release button 12 that is operated to instruct an imaging preparation operation and an imaging operation on the top surface thereof. A mount member 101 to which an unillustrated interchangeable lens unit is mounted by bayonet coupling is fixed onto a front surface of the image pickup apparatus 1. A through-hole portion 101a is provided in a mount surface 101b which is a contact surface of the mount member 101 with the interchangeable lens unit. A lock pin (lock member) 102 of a lens locking mechanism protrudes from the through-hole portion 101a and is to be inserted into a concave portion in the mount portion of the interchangeable lens unit and locks the interchangeable lens unit (prevents a releasing rotation of the bayonet coupling). An unlock button (operation member) 202 can be pressed by the user and protrudes from a hole 201a provided in a front cover 201 of the image pickup apparatus 1.

The unlock button 202 and the lock pin 102 are interlocked by a lens unlocking mechanism described later. When the unlock button 202 is pressed, the lock pin 102 located at the lock position where the lock pin 102 protrudes from the mount surface associatively moves to the unlock position where the lock pin 102 retracts from the mount surface. Thereby, the interchangeable lens unit is unlocked and can be detached.

Figure 2A:
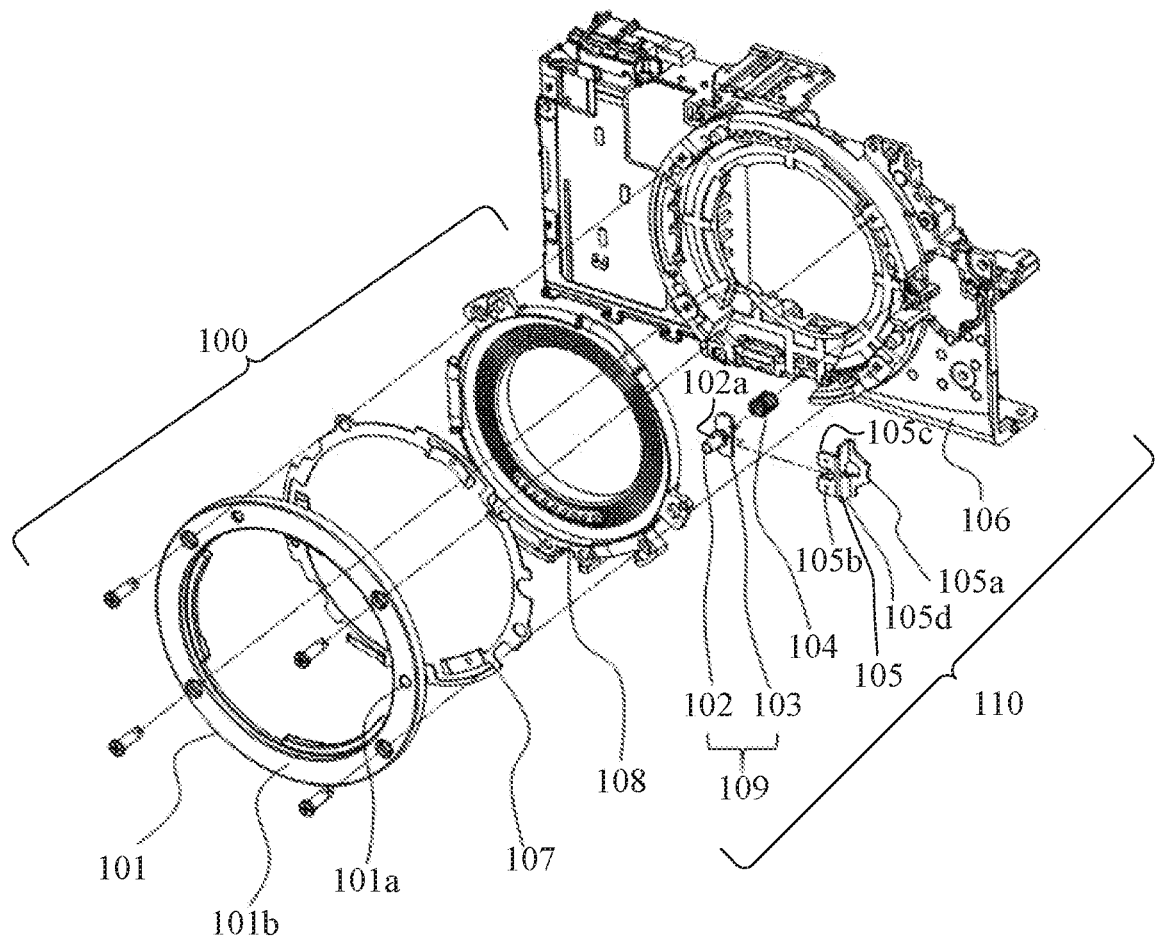
FIG. 2A is an exploded perspective view of a lens unlocking mechanism in the image pickup apparatus according to this embodiment.
Figure 2B:
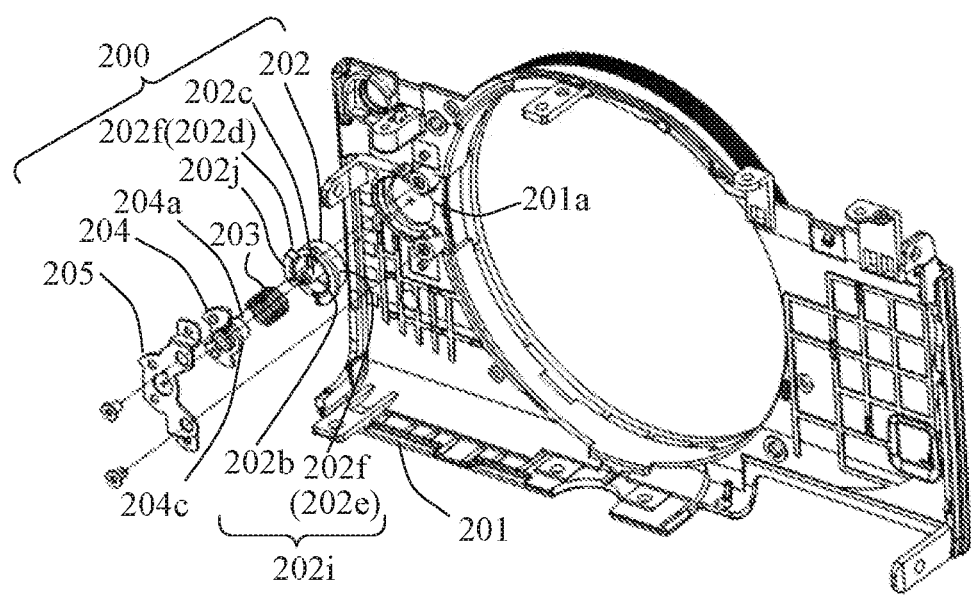
FIG. 2B is an exploded perspective view around an unlock button.

Referring now to FIGS. 2A and 2B, a description will be given of a configuration of a mount unit 100, a lens locking mechanism 110, and a lens unlocking mechanism 200. FIG. 2A is a front exploded perspective view of the mount unit 100 and the lens locking mechanism 110, both of which serve as a body member 106 of the image pickup apparatus 1 as a holding base. FIG. 2B illustrates a back exploded perspective view of the lens unlocking mechanism 200 that includes a front cover 201 as a holding base attached to the front surface of the body member 106.

The mount unit 100 includes a lens communication contact unit 108, a mount ring spring 107, and the mount member 101 that are fixed (co-fastened) onto the body member 106 with four screws. As described above, the interchangeable lens unit is mounted on the mount surface 101b of the mount member 101. The lens communication contact unit 108 includes a plurality of electric contacts with which the image pickup apparatus 1 communicates with the interchangeable lens unit. The mount ring spring 107 forces to the front the interchangeable lens unit that is bayonet-coupled to the mount member 101 and removes coupling unsteadiness between the interchangeable lens unit and the mount member 101.

The lens locking mechanism 110 includes a lock pin unit 109 (including the lock pin 102 and a lock pin holding member 103), a lock spring 104, and an interlock member 105. A pin portion 102a of the lock pin 102 is inserted into the through-hole portion 101a opened on the mount surface 101b of the mount member 101 so movably in a depth (front-back) direction (an optical axis direction of the interchangeable lens unit) in which its central axis extends. The lock pin holding member 103 is fixed onto the base of the pin portion 102a of the lock pin 102 by caulking, and constitutes the lock pin unit 109. The lock pin unit 109 is forced by the lock spring 104 in the direction of the lock position protruding forward from the mount surface 101b.

As illustrated in FIG. 2A, the interlock member 105 contacts the front surface of the lock pin holding member 103 at its two pin contact portions 105b and 105c. Thus, the interlock member 105 is forced to the front (in the same direction as the lock pin unit 109) by the lock spring 104 via the lock pin holding member 103. The interlock member 105 includes pin contact portions 105b and 105c, a button contact portion 105a that contacts the unlock button 202, and a connection portion 105d that extends in the depth direction so as to connect them with one another. The pin contact portions 105b and 105c and the button contact portion 105a are different in position from each other in the depth direction.

In FIG. 2B, the lens unlocking mechanism 200 includes the unlock button 202, a button spring (operation member spring) 203, a button shaft holding member 204, and a fixed member 205. The unlock button 202 is inserted into the hole portion 201a provided in the front cover 201 movably in the depth direction, and forced toward a nonoperation position that is a position protruded from the front cover 201 by the button spring 203. Flange portions 202f are provided at a plurality of locations of the unlock button 202. The front surfaces of these flange portions 202f are used for button stopper portions (operation member stopper portions) 202d and 202e that contact the periphery of the hole portion 201a on the rear surface of the front cover 201 to prevent the unlock button 202 from moving beyond the nonoperation position.

Provided inside the button spring 202 is a shaft portion 202c extending in the press operation direction of the button spring 203. The shaft portion 202c is engaged with and inserted into a through-hole portion provided in a cylindrical portion 204a of the button shaft holding member 204 movably in the depth direction. Thereby, the button spring 202 is held by the button shaft holding member 204 movably in the depth direction. The button spring 203 is disposed around the cylindrical portion 204a of the button shaft holding member 204. The button spring 203 is disposed between a flange portion 204c of the button shaft holding member 204 and a ceiling surface inside the unlock button 202, and forces the unlock button 202 toward the nonoperation position as described above.

The button shaft holding member 204 is fixed by the fixed member 205 by heat welding. The fixed member 205 is fixed onto the front cover (fixing portion) 201 with two screws. The lens unlocking mechanism held by the front cover 201 is positioned relative to the lens locking mechanism held by the body member 106 since the front cover 201 is fixed onto the body member 106. Thereby, an interlock contact portion 202b provided on the unlock button 202 contacts the front surface of the button contact portion 105a of the interlock member 105 with high accuracy. The interlock contact portion 202b is a rear surface of the flange portion 202f in which the above button stopper portion 202e is formed on the front surface.

Figure 3:
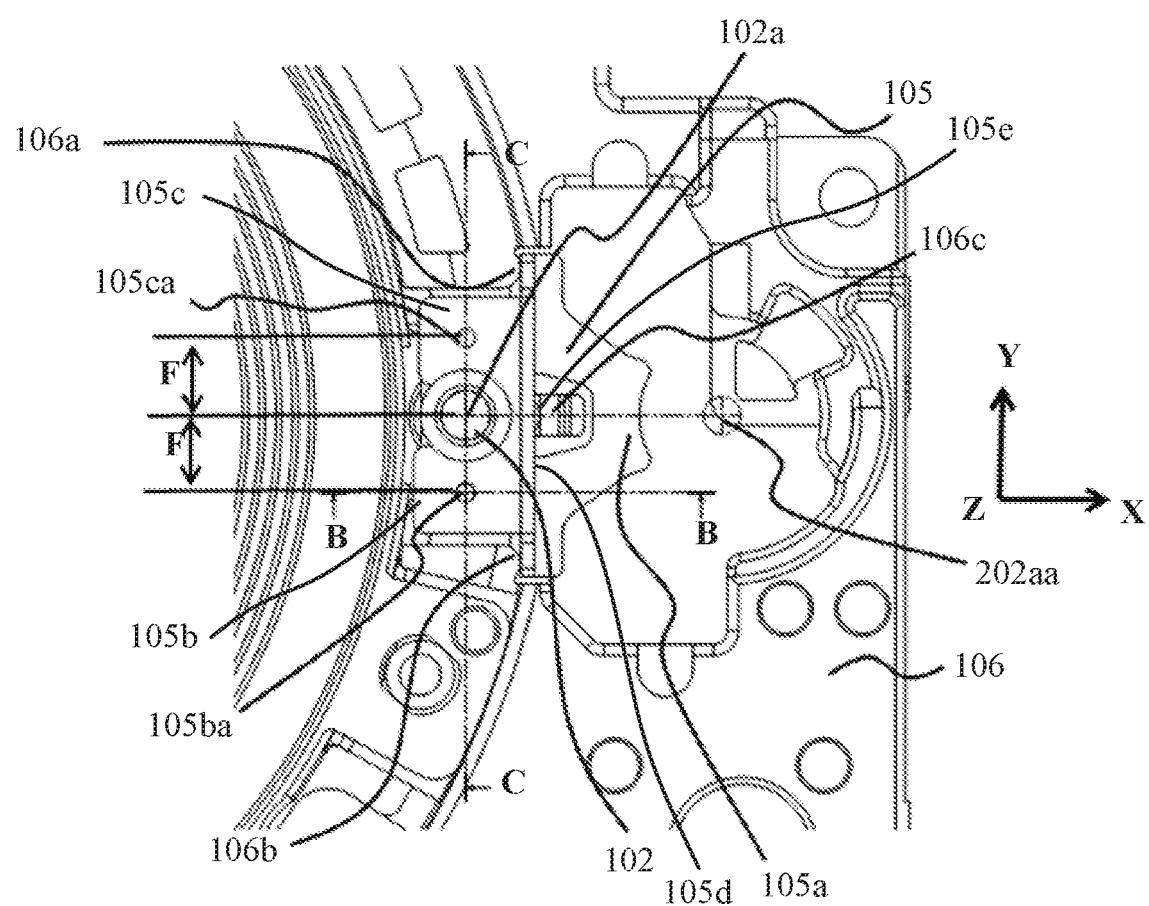
FIG. 3 illustrates details of the lens unlocking mechanism.
Figures 4A, 4B:
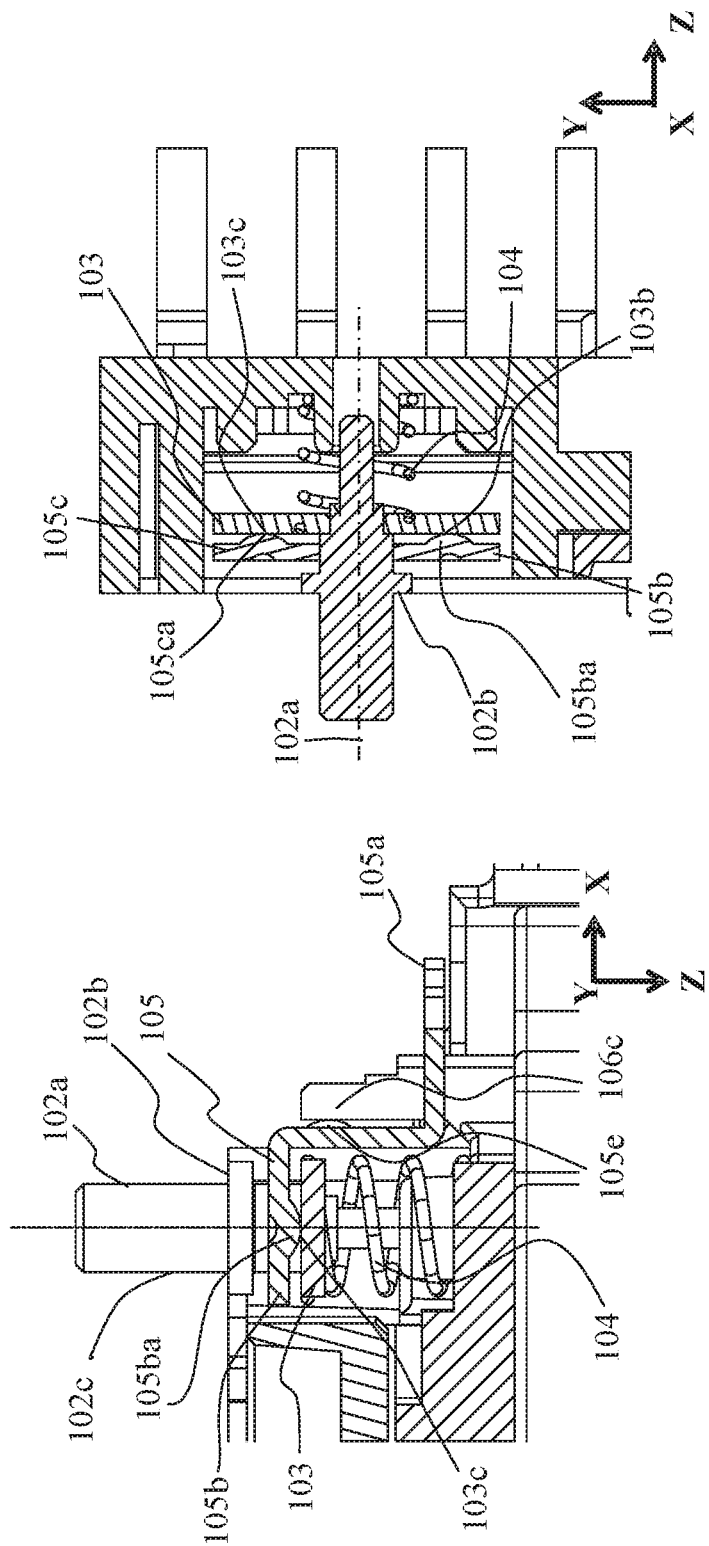
FIG. 4A is a sectional view taken along a line B-B in FIG. 3
FIG. 4B is a sectional view taken along a line C-C in FIG. 3.

Referring now to FIGS. 3, 4A, and 4B, a more detailed description will be given of the configuration of the lens locking mechanism 110 according to this embodiment. FIG. 3 illustrates the lens locking mechanism and the front cover 201 viewed from the front (press operation direction). FIG. 4A illustrates a section taken along a line B-B in FIG. 3, and FIG. 4B illustrates a section taken along a line C-C in FIG. 3. An X direction (first direction) is set to a direction in which a straight line connecting a center 102a of the lock pin 102 and a center 202aa of the unlock button 202 (not illustrated in FIG. 3) extends or a direction in which the lock pin 102 and the unlock button 202 are spaced from each other. A Y direction (second direction) is set to a direction orthogonal to the X direction and a Z direction which is the press operation direction of the unlock button 202 (and the direction in which the lock pin 102 moves from the lock position to the unlock position).

As described above, the interlock member 105 includes the button contact portion 105a, the pin contact portions 105b and 105c, and the connection portion 105d that connects them. The pin contact portions 105b and 105c respectively have convex portions 105ba and 105ca each having a curved surface shape (hemispherical shape) that is convex toward the rear. These convex portions 105ba and 105ca contact the front surfaces of contacted portions 103b and 103c of the lock pin holding member 103. The convex portions 105ba and 105ca do not necessarily have a curved surface shape, and may have a convex shape that contacts the contacted portions 103b and 103c through small areas.

This embodiment describes the convex portions 105ba and 105ca provided on the pin contact portions 105b and 105c of the interlock member 105. Alternatively, the contacted portions 103b and 103c of the lock pin holding member 103 may have convex portions having curved surfaces that are convex toward the pin contact portions 105b and 105c (or to the front), and the convex portions may contact the pin contact portions 105b and 105c of the interlock member 105. In other words, one pair of the pin contact portions 105b and 105c of the interlock member 105 and the contacted portions 103b and 103c of the lock pin holding member 103 may have convex portions with convex shapes toward the other.

This embodiment has described the lock pin holding member 103 as a separate member integrally movably fixed onto the lock pin 102 and the contact portions 103b and 103c provided on the lock pin holding member 103. Alternatively, the lock pin may have an integral portion with a shape of the lock pin holding member, and the contacted portion may be provided to this portion.

A description will be given of a contact position between the lock pin holding member 103 and the interlock member 105. As illustrated in FIG. 3, the protrusions 105ba and 105ca of the interlock member 105 that contact the lock pin holding member 103 are disposed on both sides of the lock pin 102 in the Y direction, and located at the same position as that of the center 102a of the lock pin 102 in the X direction. The convex portions 105ba and 105ca are disposed at the same distance F from the center 102a of the lock pin 102 in the Y direction.

As illustrated in FIG. 4A, the lock pin 102 includes the pin portion 102c that is movably engaged with and inserted into the through-hole portion 101a in the mount member 101, and a lock stopper portion 102b provided adjacent to the pin portion 102c in the Z direction. The lock stopper portion 102b contacts the periphery of the through-hole portion 101a on the rear surface of the mount member 101 and prevents a forward protrusion (movement) beyond the lock position. The pin contact portions 105b and 105c (convex portions 105ba and 105ca) of the interlock member 105 are positioned between the lock stopper portion 102b of the lock pin 102 and the contacted portions 103b and 103c of the lock pin holding member 103. In other words, in the Z direction, the convex portions 105ba and 105ca contact the contacted portions 103b and 103c near the pin portion 102c.

As illustrated in FIG. 3, the interlock member 105 contacts two curved surface portions 106a and 106b and a standing wall portion 106c of the body member 106 and is sandwiched movably between them in the Z direction. The interlock member 105 is guided movably in the Z direction by the convex curved surface portions 106a and 106b and the standing wall portion 106c. In other words, the interlock member 105 is guided movably in the press operation direction by the body member 106 as a base member at a plurality of locations including at least two locations on both sides of the lock pin 102 (and the unlock button 202) in the Y direction. As illustrated in FIG. 4A, a portion 105d of the interlock member 105 that contacts the standing wall 106c has a curved surface (hemisphere) shape that is convex toward the standing wall 106c. Thereby, the interlock member 105 and the body member 106 are in line contact or point contact with each other, and the frictional resistance is reduced when the interlock member 105 moves in the Z direction.

Figure 5A:
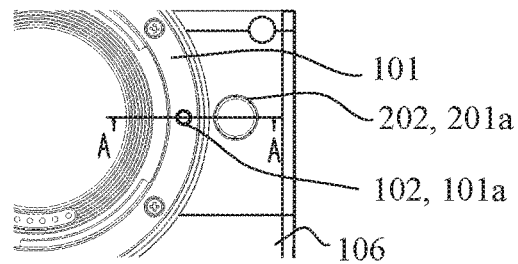
FIG. 5A is an overview of the lens unlocking mechanism according to this embodiment.
Figure 5B:
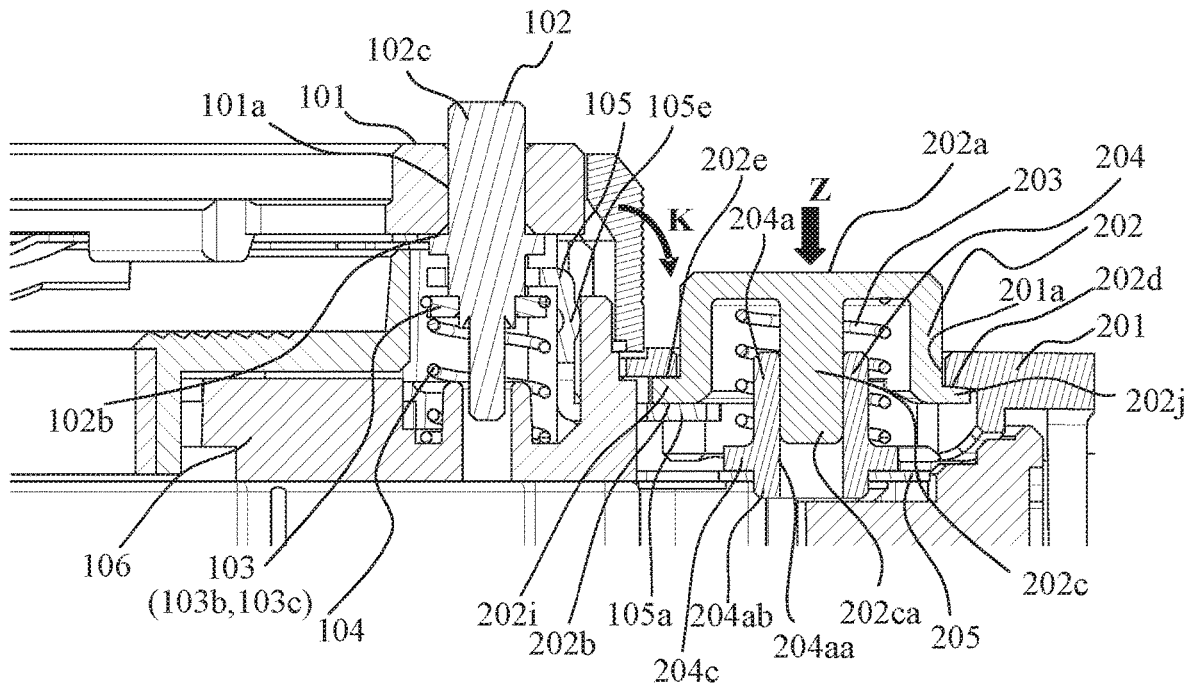
FIG. 5B is a sectional view of the lens unlocking mechanism taken along the line A-A.

Referring now to FIGS. 4A, 4B, 5A, and 5B, a description will be given of the unlock operation of the lock pin 102 by the press operation of the unlock button 202. FIG. 5A illustrates the unlock button 202 protruding from the front cover 106 and the lock pin 102 protruding from the mount member 101 when viewed from the front. FIG. 5B illustrates a section taken along a line A-A in FIG. 5A.

Figure 5C:
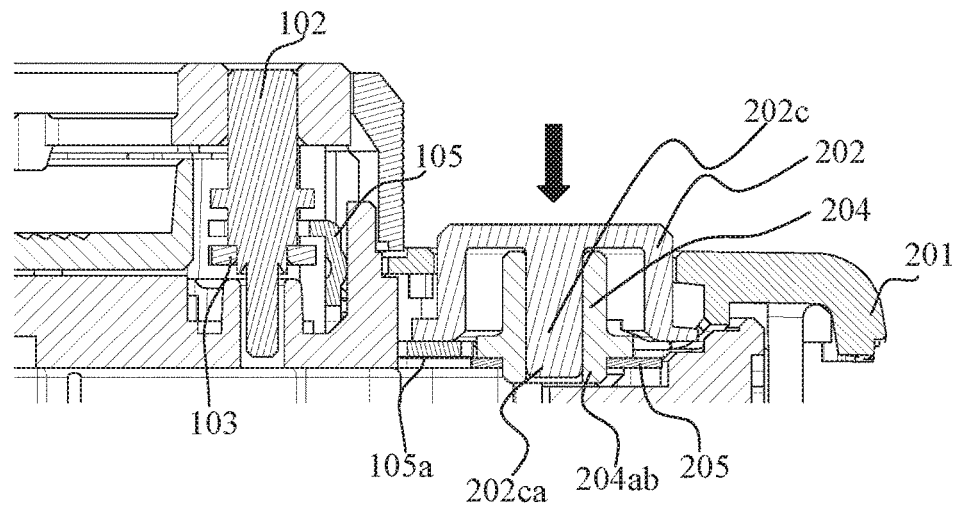
FIG. 5C is a sectional view where the unlock button is pressed.

In FIG. 5B, when the operation portion 202a of the unlock button 202 is pressed in the Z direction (to the back) as indicated by a thick arrow, the contact portion 202b of the unlock button 202 presses the button contact portion 105a of the interlock member 105 in the Z direction. Thereby, the interlock member 105 is moved in the Z direction as illustrated in FIG. 5C. The interlock member 105 is guided and held so as to be movable (slidable) in the Z direction relative to the body member 106 at three locations (106a to 106c) in the body member 106 described above.

The interlock member 105 moving in the Z direction presses the contacted portions 103b and 103c of the lock pin holding member 103 in the Z direction through the pin contact portions 105b and 105c (convex portions 105ba and 105ca), and moves the lock pin 102 together with the lock pin holding member 103 in the Z direction. As described above, the contact positions between the protrusions 105ba and 105ca of the interlock member 105 and the contacted portions 103b and 103c of the lock pin holding member 103 are located near the pin portion 102c that is engaged with and inserted into the through-hole portion 101a of the mount member 101. Hence, the lock pin 102 is less likely to tilt in the Z direction or to the through-hole portion 101a in the mount member 101, than a case where the contact positions are far from the pin portion 102c of the lock pin 102 in the Z direction. The contact positions between the projections 105ba and 105ca of the interlock member 105 and the contacted portions 103b and 103c of the lock pin holding member 103 are located at the same position as the lock pin 102 (center 102a) in the X direction, and located at the same distance from the lock pin 102 (the center 102a) in the Y direction. Hence, the lock pin 102 receives the force in the Z direction equally from the contacted portions 103b and 103c of the lock pin holding member 103, and the lock pin 102 can move in the Z direction without tilting to the through-hole portion 101a in the mount member 101.

If the unlock button 202 moves in the Z direction while tilting in the Z direction when the unlock button 202 is pressed, the interlock member 105 moves in the Z direction while tilting in an arrow K direction in FIG. 5B. However, the interlock member 105 is a separate component from the lock pin holding member 103, and the vertexes of the convex portions 105ba and 105ca of the interlock member 105 are in point contact with the contacted portions 103b and 103c of the lock pin holding member 103. Thus, even if the interlock member 105 tilts, the point contacts of the convex portions 105ba and 105ca with the contacted portions 103b and 103c are maintained, and the lock pin holding member 103 is less likely to be influenced by the tilt of the interlock member 105. Hence, it is possible to prevent the lock pin 102 fixed integrally with the lock pin holding member 103 from being inclined to the through-hole portion 101a in the mount member 101 and from moving in the Z direction.

Figure 8:
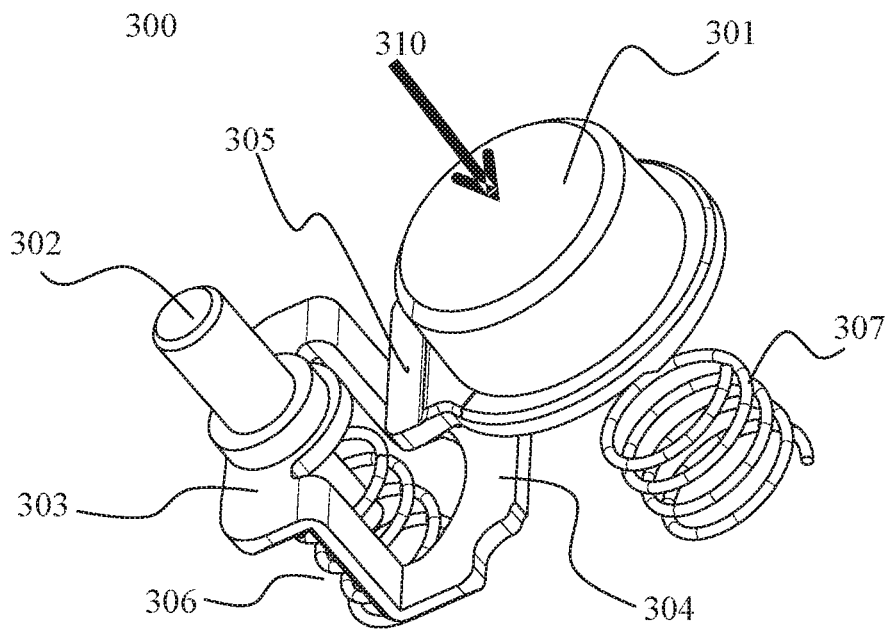
FIG. 8 is a perspective view illustrating a conventional lens unlocking mechanism.

Conventionally, as illustrated in FIG. 8, since the interlock member 303 and the lock pin 302 are an integrated component, when the interlock member 303 tilts, the lock pin 302 also tilts. As a result, the lock pin 302 moves while the outer circumferential surface of the pin portion rubs strongly the inner circumferential surface of the through-hole of the mount member, and receives the resistance to its movement. Hence, the operability of the unlock button 202 lowers.

On the other hand, this embodiment suppresses the tilt of the lock pin 102 due to the tilt of the interlock member 105, and thus reduces the rub of the pin portion 102c of the lock pin 102 against the inner circumferential surface of the through-hole portion 101a in the mount member 101, or the resistance to the movement of the lock pin 102. Hence, the operability of the unlock button 202 is improved.

Referring now to FIGS. 2B, 5B, and 5C, a description will be given of the details of the lens unlocking mechanism 200. As described with reference to FIG. 2B, the lens unlocking mechanism 200 is held by the front cover 201. In FIG. 5B, the unlock button 202 is forced toward the front by the button spring 203, and the button stopper portions 202d and 202e of the unlock button 202 contact the front cover 201 and are held in the nonoperation positions. The shaft portion 202c of the unlock button 202 is engaged with and inserted into a through-hole portion 204aa in the cylindrical portion 204a of the button shaft holding member 204 so as to be movable in the Z direction. The button shaft holding member 204 is held by the fixed member 205 that is fixed to the front cover 201.

As illustrated in FIG. 5B, the cylindrical portion 204a having the through-hole portion 204aa in the button shaft holding member 204 is held by a fixed member 205 so that its rear end portion (tip portion in the Z direction) 204b that penetrates through the fixed member 205 and protrudes in the Z direction longer than the fixed member 205. In other words, the cylindrical portion 204a and the through-hole portion 204aa of the button shaft holding member 204 penetrate through the fixed member 205 from the unlock button 202 side to the opposite side. FIG. 5C illustrates that the unlock button 202 is pressed in the Z direction, and the ceiling surface inside the unlock button 202 is located at the operation position that contacts the front end of the tube portion 204a of the button shaft holding member 204. In this state, the rear end 204ca of the shaft portion 202c of the unlock button 202 reaches the vicinity of the rear end opening of the through-hole portion 204aa in the cylindrical portion 204a. This configuration can make longer the shaft portion 202c of the unlock button 202.

As a result, as illustrated in FIG. 5B, the engagement length of the unlock button 202 located at the non-operating position with the through hole 204aa of the shaft portion 202c can be made longer, and the tilt of the unlock button 202 to the Z direction can be suppressed. Thereby, the operability of the unlock button 202 is improved.

Figures 6A, 6B:
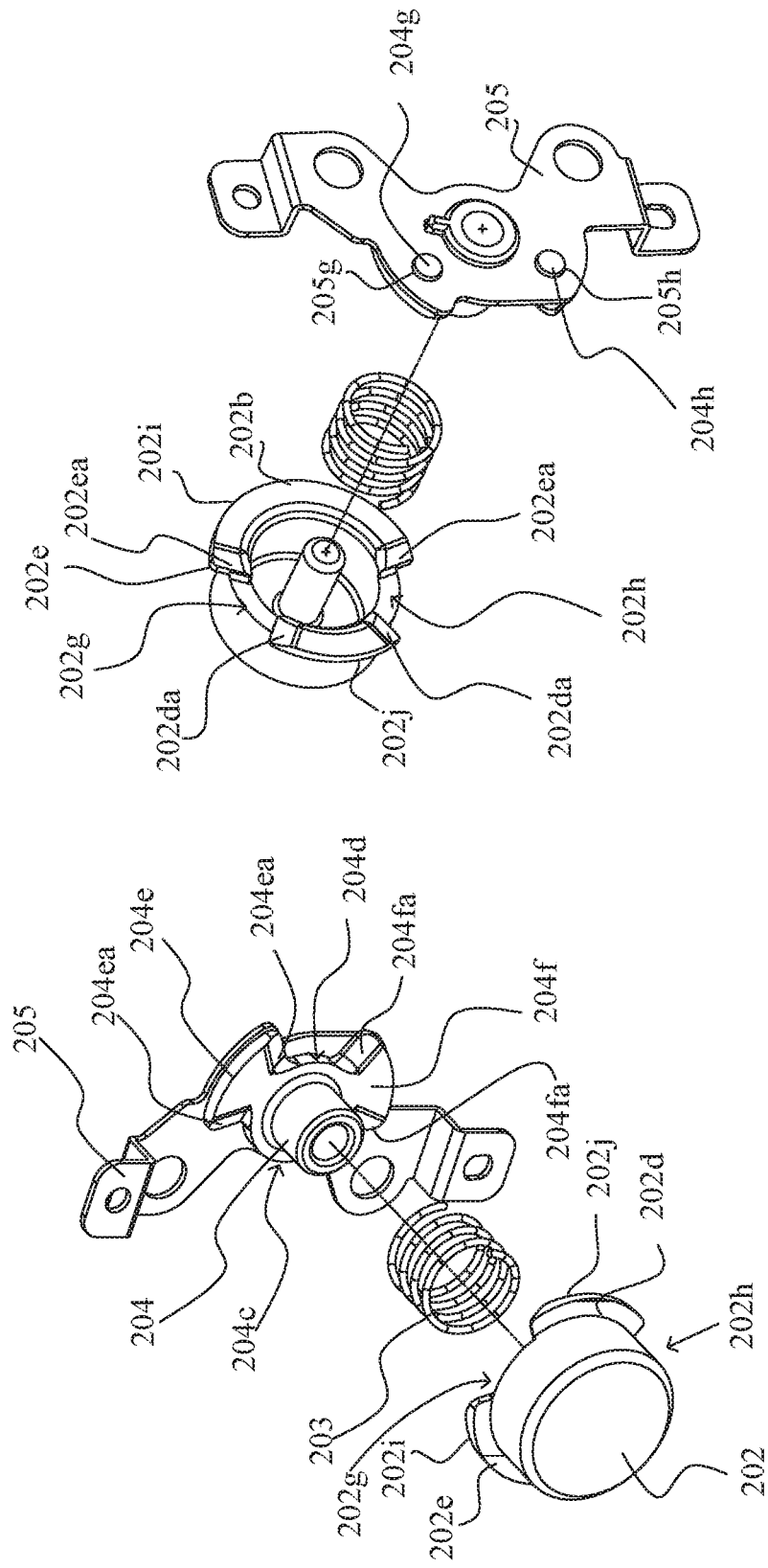
FIG. 6A is an exploded perspective view of the lens unlocking mechanism according to the embodiment.
FIG. 6B is its rear exploded perspective view.
Figure 7:
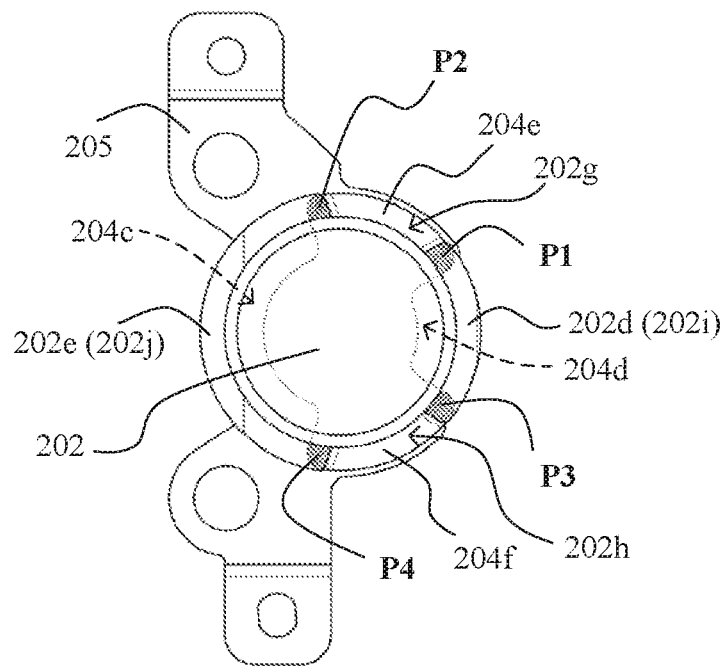
FIG. 7 is a front view illustrating part of the lens unlocking mechanism according to the embodiment.

Referring now to FIGS. 6A, 6B, and 7, a description will be given of more detailed shapes of the unlock button 202 and the button shaft holding member 204. FIGS. 6A and 6B are front and back exploded views of the lens unlocking mechanism. As illustrated in these drawings, two divided flange portions 202i and 202j provided with the button stopper portions 202e and 202d in the unlock button 202 are provided in the circumferential direction of the unlock button 202, and there are notches (concave portions) 202g and 202h between them. Similarly, the button shaft holding member 204 also has two divided flange portions 204e and 204f and notch portions (concave portions) 204c and 204d between them.

As illustrated in FIG. 6B, convex portions 204g and 204h projecting from hole portions 205g and 205h provided in the fixed member 205 are provided on the rear surfaces of the flange portions 204e and 204f of the button shaft holding member 204. The button shaft holding member 204 is fixed (thermally welded) to the fixed member 205 by thermally melting the convex portions 204g and 204h.

FIG. 7 illustrates the unlock button 202 and the button shaft holding member 204 in an overlapping manner when viewed from the front (in the press operation direction). A dotted line in FIG. 7 illustrates the outer shape of the button shaft holding member 204. As illustrated in this figure, the two notches 202g and 202h in the unlock button 202 are disposed at the same positions as those of the two flanges 204e and 204f of the button shaft holding member 204 as viewed from the front. The two flange portions 202i and 202j of the unlock button 202 are also disposed at the same positions as those of the two notches 204c and 204d of the button shaft holding member 204 when viewed from the front.

With this configuration, the flange portions 202i and 202j of the unlock button 202 that have been pressed and moved to the operating position are inserted into the notches 204c and 204d of the button shaft holding member 204 without interfering with the flange portions 204e and 204f. Similarly, the flange portions 204e and 204f of the button shaft holding member 204 are inserted into the notches 202g and 202h in the unlock button 202.

When the unlock button and the button shaft holding member dispense with the notches as described above, it is necessary to dispose the flange portion of the button shaft holding member at a position closer to the back so that their flange portions do not interfere with each other. As a result, the lens unlocking mechanism becomes larger in the Z direction, and it is difficult to incorporate the lens unlocking mechanism into an image pickup apparatus that demanded to be thinner.

On the other hand, the configuration according to this embodiment can make compact the lens unlocking mechanism in the Z direction and easily incorporate it in the low-profile image pickup apparatus 1, since the flange portions 204e and 204f of the button shaft holding member 204 can be located at positions closer to the front.

The unlock button 202 is disposed with a slight clearance from the hole portion 201a in the front cover 201. Any gaps viewed from the front between the ends on the notches 202g and 202h side of the flange portions 202i and 202j of the unlock button 202 and the ends on the flange portions 204e and 204f side of the notches 204c and 204d of the button shaft holding member 204 unveil the inside of the image pickup apparatus 1.

Therefore, as hatched in FIG. 7, the flange portions 202i and 202j of the unlock button 202 on the notches 202g and 202h side, and the notches 204c and 204d of the button shaft holding member 204 on the flange portions 204e and 204f side have overlapping portions P1 to P4 that overlap each other when viewed from the front. More specifically, as illustrated in FIGS. 6A and 6B, slope portions 202ea and 202da are provided to the flange portions 202i and 202j of the unlock button 202 on the notches 202g and 202h side, respectively. In addition, slope portions 204ea and 204fa are provided to the notches 204c and 204d of the button bearing member 204 on the flange portions 204e and 204f side, respectively. These overlapping portions P1 to P4 can avoid the inside of the image pickup apparatus 1 from being seen through the gaps as described above.

Even in this case, it is necessary that the flange portions 202i and 202j of the unlock button 202 can be inserted into the notches 204c and 204d of the button bearing member 204 when the unlock button 202 moves to the operation position. Among the slope portions 202ea, 202da, 204ea, and 204fa, the slope portions that overlap each other when viewed from the front form as slope portions that are inclined in the same direction to the press operation direction. When the unlock button 202 moves to the operation position, the slope portion on the unlock button 202 side and the slope portion on the button bearing member 204 side secure run-off. The flange portions 202i and 202j of the unlock button 202 can be inserted into the 204c and 204d in the button bearing member 204.

This embodiment can provide a compact image pickup apparatus having a lens unlocking mechanism that can provide a good operational feeling.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-013795, filed on Jan. 30, 2019, which is hereby incorporated by reference herein in its entirety.

What is claimed is:

1. An image pickup apparatus comprising:
    a mount portion on which an interchangeable lens unit is mounted;
    a lock member movable between a lock position for locking the interchangeable lens unit mounted on the mount portion and an unlock position for unlocking the interchangeable lens unit, and forced from the unlock position toward the lock position;
    an operation member movable from a nonoperation position to an operation position in response to a press operation for moving the lock member from the lock position to the unlock position, the operation member having a shaft portion that extends in a direction of the press operation inside of the operation member;
    an interlock member movable by the pressed operation member and configured to move the lock member from the lock position to the unlock position;
    a shaft holding member having a hole portion in which the shaft portion is movably inserted in the direction of the press operation; and
    a fixing member configured to hold the shaft holding member and fixed onto the image pickup apparatus,
    wherein the lock member includes a lock stopper portion configured to prevent the lock member from protruding from the mount portion beyond the lock position,
    wherein the interlock member includes a contact portion configured to contact a contacted portion provided on either the lock member or a member configured to move integrally with the lock member,
    wherein in the direction of the press operation, the contact portion is located between the lock stopper portion and the contacted portion,
    wherein in a plane including the direction of the press operation and a first direction in which the operation member and the lock member are disposed separately from each other, the lock stopper portion, the contact portion, and the contacted portion are arranged along the direction of the press operation,
    wherein at least one of the contact portion and the contacted portion has a convex shape toward the other, the convex shape being convex in the direction of the press operation, and
    wherein the shaft holding member perforates through the fixing member from a side of the operation member to an opposite side.

2. The image pickup apparatus according to claim 1, wherein the convex shape has a convex curved surface shape.

3. The image pickup apparatus according to claim 1, wherein when the operation member is viewed from the direction of the press operation, the operation member and the lock member are spaced from each other in the first direction, and the contact portion contacts the contacted portion on both sides of the lock member in a second direction orthogonal to the first direction.

4. The image pickup apparatus according to claim 1, wherein when the operation member is viewed from the direction of the press operation, the operation member and the lock member are spaced from each other in the first direction, and the interlock member is movably guided in the direction of the press operation at a plurality of locations including at least two locations, one on each side of the lock member in a second direction orthogonal to the first direction.

5. The image pickup apparatus according to claim 1, wherein the hole portion in the shaft holding member perforates through the shaft holding member in the direction of the press operation.

6. The image pickup apparatus according to claim 1, wherein the operation member includes an operation member stopper portion configured to prevent the operation member from moving beyond the nonoperation position, and
    wherein the operation member stopper portion enters a concave portion provided in the shaft holding member when the operation member moves to the operation position.

7. The image pickup apparatus according to claim 6, wherein the operation member stopper portion and the concave portion have overlapping portions when viewed from the direction of the press operation.

8. The image pickup apparatus according to claim 7, wherein the overlapping portions have slope shape inclined in the same direction to the direction of the press operation.

9. The image pickup apparatus according to claim 1, wherein the direction of the press operation is an optical axis direction of the interchangeable lens.

* * * * *